United States Patent
Hayashida et al.

(10) Patent No.: US 10,075,029 B2
(45) Date of Patent: Sep. 11, 2018

(54) POSITION MISALIGNMENT DETECTION DEVICE AND ELECTRONIC APPARATUS

(71) Applicant: ROHM CO., LTD., Kyoto-shi, Kyoto (JP)

(72) Inventors: Hideharu Hayashida, Kyoto (JP); Tatsuya Iwasaki, Kyoto (JP); Takeshi Nozawa, Kyoto (JP); Kazuyoshi Yasuoka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 103 days.

(21) Appl. No.: 15/062,783

(22) Filed: Mar. 7, 2016

(65) Prior Publication Data
US 2017/0025895 A1 Jan. 26, 2017

Related U.S. Application Data

(63) Continuation of application No. PCT/JP2014/070469, filed on Aug. 4, 2014.

(30) Foreign Application Priority Data

Sep. 6, 2013 (JP) ................................. 2013-184976

(51) Int. Cl.
*H02J 50/90* (2016.01)
*H02J 50/10* (2016.01)
(Continued)

(52) U.S. Cl.
CPC .............. *H02J 50/90* (2016.02); *H02J 7/025* (2013.01); *H02J 50/10* (2016.02); *H02J 50/12* (2016.02); *H02J 50/80* (2016.02)

(58) Field of Classification Search
CPC .. H02J 50/90; H02J 5/005; H02J 7/025; H02J 17/00; H04B 5/0025–5/0093;
(Continued)

(56) References Cited

U.S. PATENT DOCUMENTS

2006/0247737 A1* 11/2006 Olson .................. A61N 1/3787
607/61
2006/0268971 A1* 11/2006 Watabe .................. G01R 23/10
375/226
(Continued)

FOREIGN PATENT DOCUMENTS

CN 101809842 A 8/2010
CN 103107008 A 5/2013
(Continued)

OTHER PUBLICATIONS

International Search Report corresponding to Application No. PCT/JP2014/070469, dated Oct. 28, 2014, with English translation.
(Continued)

*Primary Examiner* — Rexford Barnie
*Assistant Examiner* — Thai Tran
(74) *Attorney, Agent, or Firm* — Cantor Colburn LLP

(57) ABSTRACT

The position misalignment detection device includes: a comparator configured to compare an electric current induced by a receiving coil in a receiver (RX) to which an electric power is transmitted from a transmitter (TX) with a non-contact power supply transmitter method; a frequency counter connected to the comparator, the frequency counter configured to count transmit frequency fi transmitted from the transmitter; and a register configured to store a counted value $F_i$ counted by the frequency counter. There is provided the position misalignment detection device which can detect a position misalignment of the receiver on the transmitter during electric charging.

19 Claims, 14 Drawing Sheets

(51) Int. Cl.
  *H02J 50/80* (2016.01)
  *H02J 50/12* (2016.01)
  *H02J 7/02* (2016.01)
(58) Field of Classification Search
  CPC .................. B60L 5/005; B60L 11/182; B60L 11/1829–11/1831; Y02T 90/122; H01F 38/14; H01F 2038/143–2038/146; A61B 1/00029; A61N 1/3787
  USPC .......................................... 307/104; 320/108
  See application file for complete search history.

(56) References Cited

U.S. PATENT DOCUMENTS

| | | | | |
|---|---|---|---|---|
| 2011/0182412 A1* | 7/2011 | Takuno | ................... | H04L 12/10 379/39 |
| 2011/0270462 A1 | 11/2011 | Amano et al. | | |
| 2012/0052923 A1* | 3/2012 | Park | ...................... | H01M 10/44 455/567 |
| 2013/0096651 A1* | 4/2013 | Ozawa | ................. | A61N 1/3787 607/61 |
| 2013/0119779 A1 | 5/2013 | Jung | | |

FOREIGN PATENT DOCUMENTS

| | | |
|---|---|---|
| EP | 2595162 A2 | 5/2013 |
| JP | 2008017562 A | 1/2008 |
| JP | 2010119246 A | 5/2010 |
| JP | 2011244624 A | 12/2011 |
| JP | 2012080772 A | 4/2012 |
| JP | 2013038854 A | 2/2013 |
| JP | 2013106045 A | 5/2013 |
| JP | 2013118720 A | 6/2013 |
| TW | 201320529 A | 5/2013 |
| WO | 2010055381 A1 | 5/2010 |
| WO | 2012081519 A1 | 6/2012 |

OTHER PUBLICATIONS

Written Opinion of the International Searching Authority corresponding to Application No. PCT/JP2014/070469, dated Oct. 28, 2014.
SIPO First Office Action for corresponding CN Patent Application No. 201480048862.X; dated Aug. 28, 2017.
Taiwanese Office Action corresponding to Application No. 103130470; dated Nov. 3, 2017.

* cited by examiner

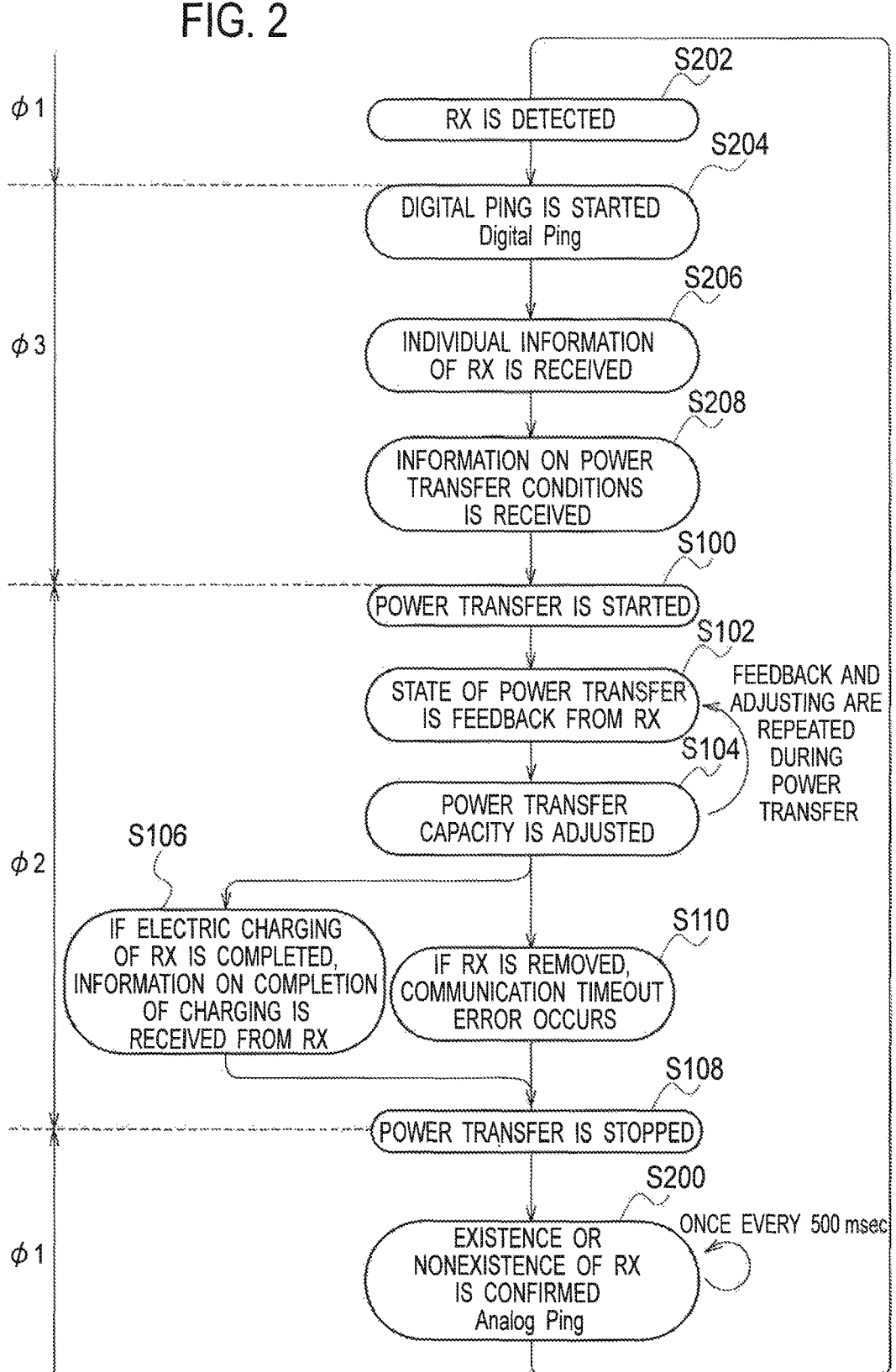

TIME t (sec)

TIME t (sec)

US 10,075,029 B2

POSITION MISALIGNMENT DETECTION DEVICE AND ELECTRONIC APPARATUS

CROSS REFERENCE TO TED APPLICATIONS

This is a continuation application (CA) of PCT Application No. PCT/JP2014/070469, filed on Aug. 4, 2014, which claims priority to Japan Patent Application No. P2013-184976 filed on Sep. 6, 2013 and is based upon and claims the benefit of priority from prior Japanese Patent Applications P2013-184976 filed on Sep. 6, 2013 and PCT Application No. PCT/JP2014/070469, filed on Aug. 4, 2014, the entire contents of each of which are incorporated herein by reference.

FIELD

The embodiment described herein relates to a position misalignment detection device and an electronic apparatus. In particular the embodiment relates to: a device for detecting position misalignment of a receiver to which an electric power is transmitted from a transmitter with a non-contact power supply transmitter method; and an electronic apparatus.

BACKGROUND

In recent years, there is beginning to spread a non-contact power supply transmitter methods (it is also called a wireless power supply transmitter method or a contactless power transmission method.) for supplying power to electronic apparatuses, e.g. mobile phoned, tablet-type devices, etc. In order to promote interoperation between products of which manufacturers are different from each other, Wireless Power Consortium (WPC) was organized, and then the Qi standard which is the International Standard was developed by WPC.

Such a non-contact power supply system includes a transmitter (TX) and a receiver (RX).

SUMMARY

The embodiment provides: a position misalignment detection device which can detect a position misalignment of a receiver on a transmitter during electric charging; and an electronic apparatus on which such a position misalignment detection device is mounted.

According to one aspect of the embodiment, there is provided a position misalignment detection device comprising: a comparator configured to compare an electric current induced by a receiving coil in a receiver to which an electric power is transmitted from a transmitter with a non-contact power supply transmitter method; a frequency counter connected to the comparator, the frequency counter configured to count a transmit frequency transmitted from the transmitter; and a register configured to store a counted value counted by the frequency counter, wherein a position misalignment of the receiver on the transmitter can be detected during electric charging.

According to another aspect of the embodiment, there is provided an electronic apparatus comprising:
a receiver to which an electric power is transmitted from a transmitter with a non-contact power supply transmitter method; a position misalignment detection device connected to the receiver, the position misalignment detection device capable of detecting a position misalignment of the receiver on the transmitter during electric charging; and a control unit connected to the receiver and the position misalignment detection device.

According to the embodiment, there can be provided the position misalignment detection device which can detect the position misalignment of the receiver on the transmitter during electric charging, and the electronic apparatus on which such a position misalignment detection device is mounted.

BRIEF DESCRIPTION OF DRAWINGS

FIG. 2 is an operating sequence diagram showing a transmitting device (TX) in the non-contact power supply transmitter system according to the basic technology.

DESCRIPTION OF EMBODIMENTS

Figure 1:
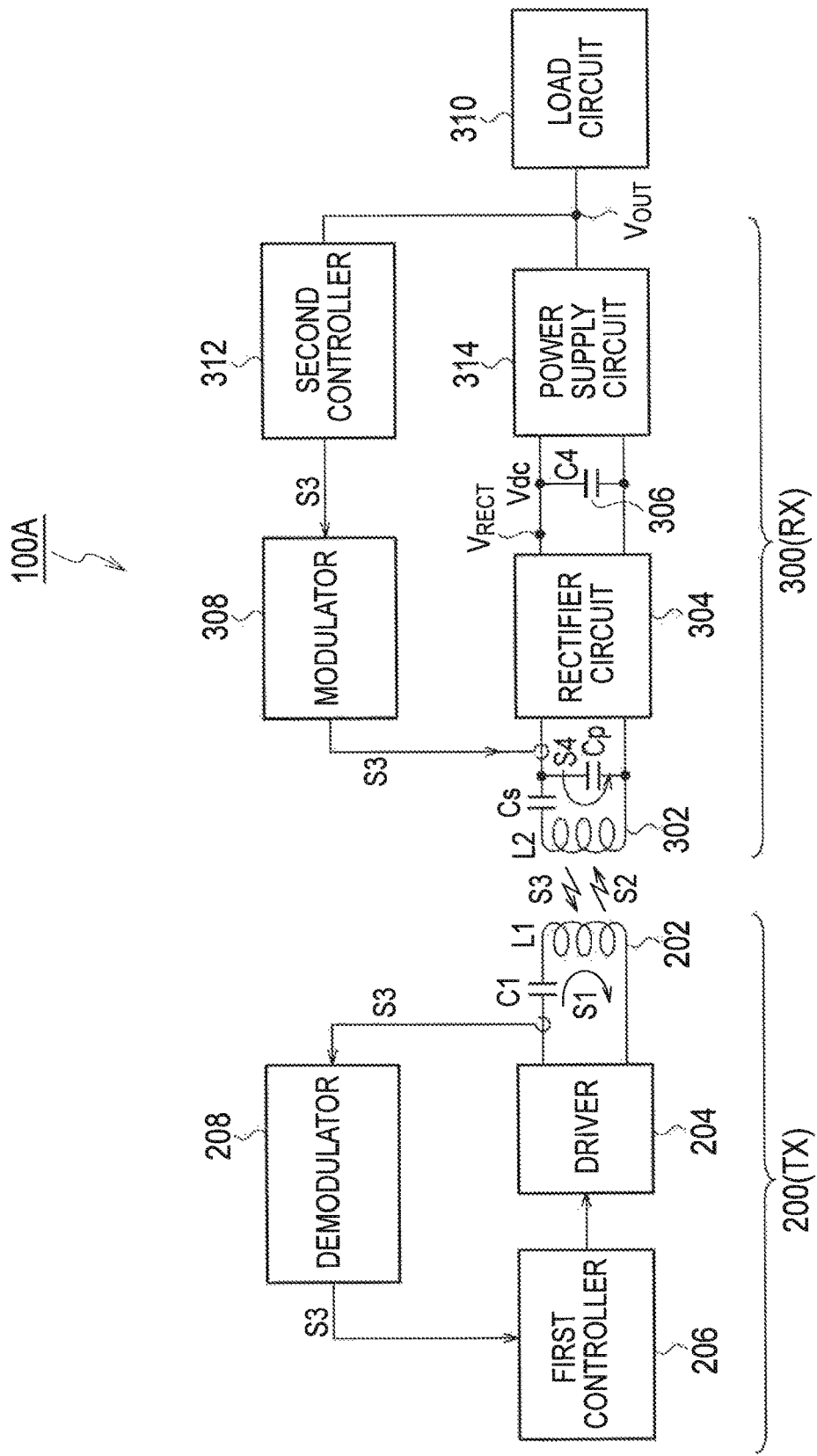
FIG. 1 is a schematic block configuration diagram of a non-contact power supply system according to a basic technology.

Next, a certain embodiment will be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiment described hereinafter merely exemplifies the device and method for materializing the technical idea; and the embodiment does not specify the material, shape, structure, placement, etc. of each component part as the following. The embodiment may be changed without departing from the spirit or scope of claims.

(Basic Technology: Non-Contact Power Supply Transmitter System)

FIG. 1 shows a schematic block configuration of a non-contact power supply transmitter system 100A according to a basic technology. As shown in FIG. 1, the non-contact power supply transmitter system 100A is a system adhere to the Qi standard, and includes a transmitting device (TX) 200 and a receiving device (RX) 300.

The transmitting device (TX) 200 includes a transmitting coil (primary coil) 202, a driver 204, a first controller 206, and a demodulator 208. The driver 204 includes an H bridge circuit (full bridge circuit) or a half bridge circuit.

The driver 204 applies a driving signal S1 (more specifically, pulse signal) to the transmitting coil 202, and then causes the transmitting coil 202 to generate a power signal S2 of an electromagnetic field with a driving current flowing into the transmitting coil 202.

The first controller 206 comprehensively controls the whole of the transmitting device (TX) 200. More specifically, the first controller 206 changes transmission power by controlling a switching frequency of the driver 204, or a duty cycle ratio of switching.

The Qi standard defines a communications protocol between the transmitting device (TX) 200 and the receiving device (RX) 300, and can transfer information according to the control signal S3 from the receiving device (RX) 300 to the transmitting device (TX) 200. The control signal S3 is transmitted in the form of being modulated with the Amplitude Modulation (AM) using a backscatter modulation from the receiving coil (secondary coil) 302 to the transmitting coil 202. The control signal S3 includes power control data for indicating an amount of power supplied to the receiving device (RX) 300, and data for indicating specific information on the receiving device (RX) 300, for example.

The demodulator 208 demodulates the control signal S3 included in the electric current or voltage of the transmitting coil 202. The first controller 206 controls the driver 204 on the basis of the power control data included in the demodulated control signal S3.

The receiving device (RX) 300 includes a receiving coil (secondary coil) 302, a rectifier circuit 304, a capacitor 306, a modulator 308, a load circuit 310, a second controller 312, and a power supply circuit 314.

The receiving coil 302 receives the power signal S2 from the transmitting coil 202, and transmits the control signal S3 to the transmitting coil 202.

The rectifier circuit 304 and the capacitor 306 rectify and smooth an electric current S4 induced by the receiving coil 302 in accordance with the power signal S2, and then convert the rectified and smoothed electric current S4 into DC voltage.

The power supply circuit 314 charges a secondary battery (not illustrated) using the power supplied from the transmitting device (TX) 200, or boosts or steps down the DC voltage Vdc, and supplies it to the second controller 312 and other load circuit 310.

The second controller 312 monitors the amount of the power received by the receiving device (RX) 300, and then generates the power control data for indicating the amount of the supplied power in accordance to the monitoring.

The modulator 308 modulates the coil current and coil voltage of the transmitting coil 202 by modulating the control signal S3 including the power control data, and modulating the coil current of the receiving coil 302.

(Basic Technology: Operating Sequence)

FIG. 2 shows an operating sequence of the transmitting device (TX) 200 in the non-contact power supply transmitter system 100A according to the basic technology. As shown in FIG. 2, the state of the transmitting device (TX) 200 is classified roughly into a Selection Phase φ1, a Power Transfer Phase φ2, and Identification and Configuration Phase φ3.

—Power Transfer Phase φ2—

First, the power transfer phase φ2 will now be explained.
(a) In Step S100, a power transfer from the transmitter (TX) 200 to the receiver (RX) 300 is firstly started.

(b) Next, in Step S102, a control signal S3 which indicates a current power transfer state is fed back from the receiver (RX) 300 to the transmitter (TX) 200.

(c) Thereby, as shown in Step S104, the transmitter (TX) 200 adjusts power transfer capacity on the basis of the control signal S3. The feedback of the control signal S3 and the adjusting of the power transfer capacity are repeated during the power transfer (Step S102→Step S104→Step S102→ . . . ).

(d) Next, if the control signal S3 indicating completion of charging is transmitted from the receiving device (RX) 300 to the transmitting device (TX) 200 in Step S106, or if the receiving device (RX) 300 is removed from the power transmission range of the transmitting device (TX) 200, and thereby a timeout error of communication occurs in Step S110, the transmitting device (TX) 200 stops the power transfer by detecting the state in Step S108, and then the state of the transmitting device (TX) 200 is shifted to the selection phase φ1.

—Selection Phase φ1—

Next, the selection phase φ1 will now be explained.

(e) Firstly, in Step S200, the transmitting device (TX) 200 transmits the power signal S2 at predetermined interval (object detection interval, e.g. 500 msec), and thereby confirms (pings) the existence or nonexistence of the receiving device (RX) 300. Such a confirmation is called an analog ping phase.

(f) Next, in Step S202, if the receiver (RX) 300 is detected, the state of the transmitting device (TX) 200 is shifted to the identification & configuration phase φ3.

—Identification & Configuration Phase φ3—

Finally, the identification & configuration phase φ3 will now be explained.

(g) Firstly, in Step S204, the transmitter (TX) 200 executes the digital ping phase.

(h) Next, in Step S206, the transmitter (TX) 200 receives individual information of the receiver (RX) 300.

(i) Subsequently, in Step S208, information regarding power transfer conditions is transmitted from the receiver (RX) 300 to the transmitter (TX) 200. Consequently, the state of the transmitting device (TX) 200 is shifted to the power transfer phase φ2.

Figure 3A:
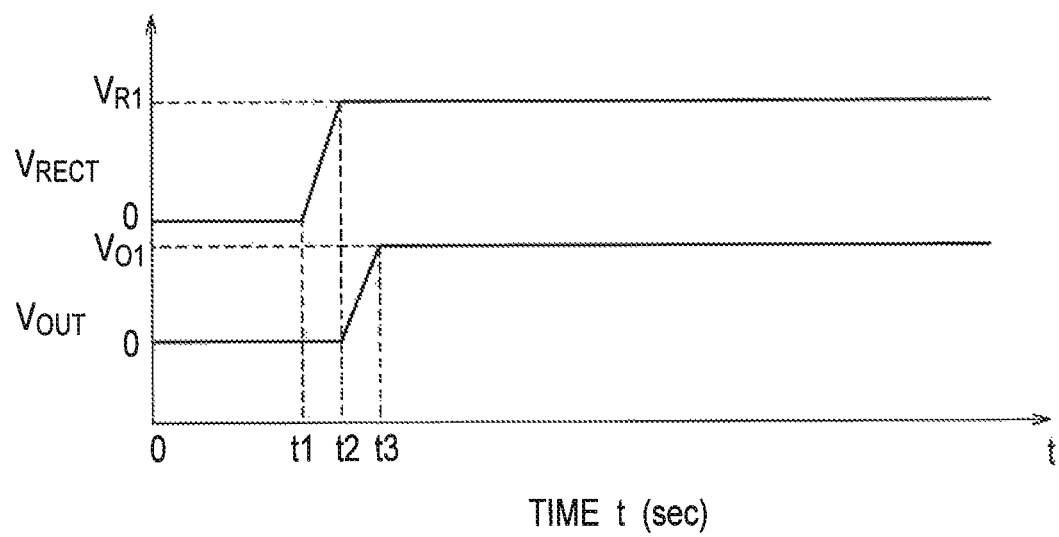
FIG. 3A shows a relationship between a RECT starting voltage $V_{RECT}$ and an output voltage $V_{OUT}$, without a position misalignment, in a receiver of the non-contact power supply system according to basic technology.
Figure 3B:
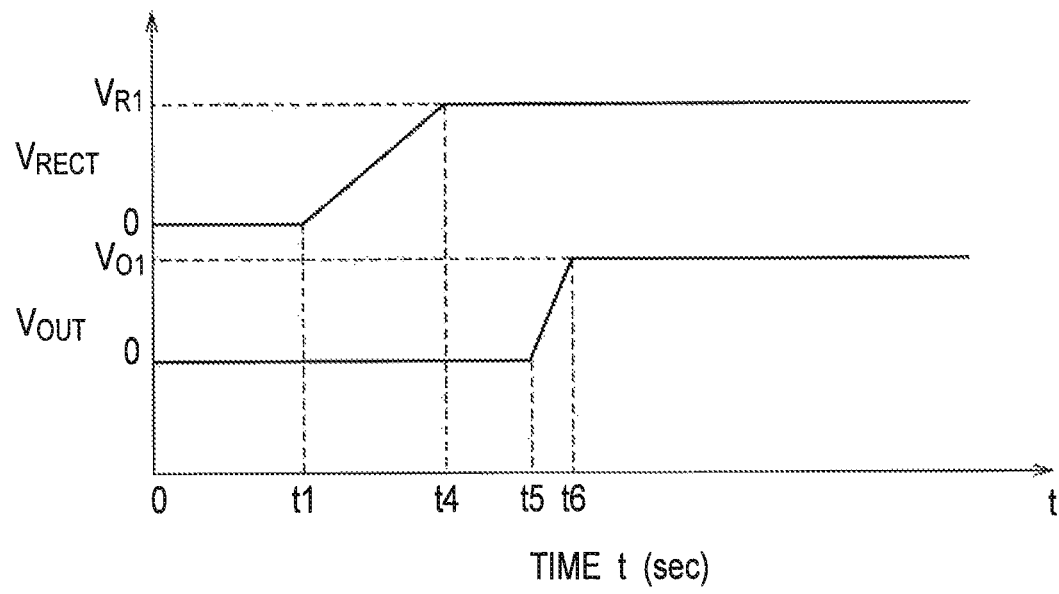
FIG. 3B shows a relationship between the RECT starting voltage $V_{RECT}$ and the output voltage $V_{OUT}$, with a position misalignment, in the receiver of the non-contact power supply system according to basic technology.

In the receiver (RX) 300 of the non-contact power supply system A according to basic technology, FIG. 3A shows a relationship between a RECT starting voltage $V_{RECT}$ and an output voltage $V_{OUT}$, without a position misalignment, and FIG. 3B shows the relationship therebetween with a position misalignment.

If there is no position misalignment in the receiver (RX) 300 of the non-contact power supply system 100A according to the basic technology, as shown in FIG. 3A, the RECT starting voltage $V_{RECT}$ rises from 0V to voltage $V_{R1}$ during time t1 to time t2. On the other hand, the output voltage $V_{OUT}$ of the power supply circuit 314 rises from to 0V to voltage $V_{o1}$ during time t2 to time t3. In contrast, as shown in FIG. 3B if there is a position misalignment, the RECT starting voltage $V_{RECT}$ rises from 0V to voltage $V_{R1}$ during time t1 to time t4. On the other hand, the output voltage $V_{OUT}$ of the power supply circuit 314 rises from 0V to voltage $V_{o1}$ during time t5 to time t6. If there is no position misalignment, as shown in FIG. 3A, response time of the output voltage $V_{OUT}$ with respect to the rising of the RECT starting voltage $V_{RECT}$ is relatively short.

On the other hand, as shown in FIG. 3B, if there is a position misalignment, the response time of the output voltage $V_{OUT}$ with respect to the rising of the RECT starting voltage $V_{RECT}$ is relatively long.

Thus, in the receiver of the non-contact power supply system according to the basic technology, only the position misalignment is detected by observing the inclinations of rising of the RECT starting voltage $V_{RECT}$ and the output voltage $V_{OUT}$ at the time when the receiver (RX) is disposed on the transmitter (TX). Accordingly, if the receiver (RX) is misaligned during electric charging, it is difficult to detect the position misalignment since the value of the RECT starting voltage $V_{RECT}$ and the value of the output voltage $V_{OUT}$ are already held at a constant state.

Thus, in the non-contact power supply system according to the basic technology, when electric-charging the receiver (RX) from the transmitter (TX), charging efficiency of the non-contact power supply system is reduced if there is a position misalignment between the transmitter (TX) and the receiver (RX).

Embodiment

Figure 4:
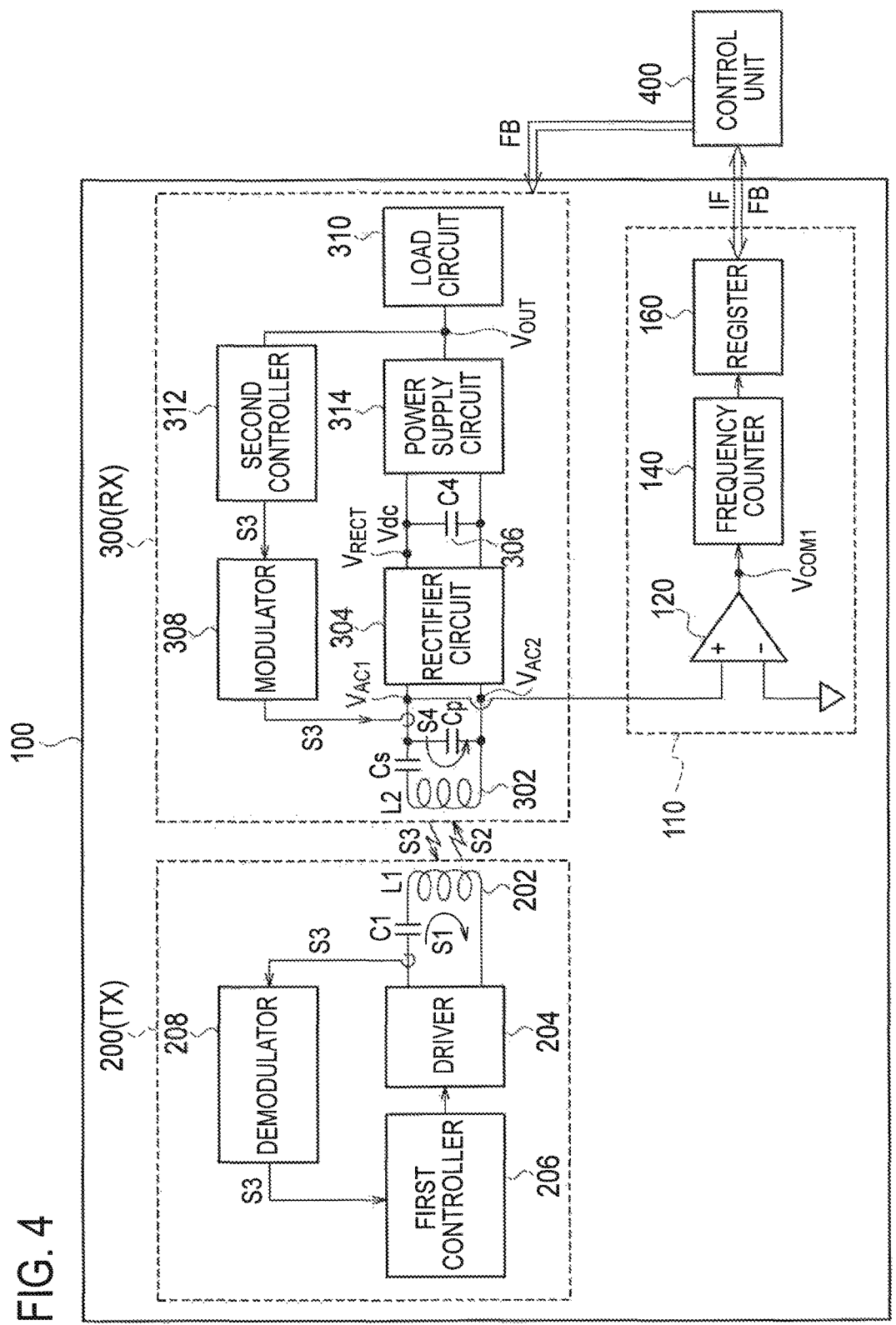
FIG. 4 is a schematic block configuration diagram of the non-contact power supply system to which a position misalignment detection device according to the embodiment is applied.

FIG. 4 shows a schematic block configuration of a non-contact power supply system 100 to which a position misalignment detection device 110 according to the embodiment is applied.

The non-contact power supply system 100 to which the position misalignment detection device 110 according to the embodiment is applied transmits an electric power from the transmitter 200 (TX) to the receiver 300 (RX) with a non-contact power supply transmitter method, and can also transfer information from the receiver 300 (RX) to the transmitter 200 (TX) using the control signal S3.

The receiver 300 (RX) to which the position misalignment detection device 110 according to the embodiment is applied includes: a receiving coil 302; a rectifier circuit 304 and a capacitor (C4) 306; and a second controller 312; a power supply circuit 314; and a modulator 308.

The receiving coil 302 receives the power signal S2 from the transmitting coil 202, and also transmits the control signal S3 to the transmitting coil 202.

The rectifier circuit 304 and the capacitor 306 rectify and smooth an electric current S4 induced by the receiving coil 302 in accordance with the power signal S2, and then convert the rectified and smoothed electric current S4 into DC voltage.

The second controller 312 monitors the amount of the power received by the receiving device (RX) 300, and then generates the power control data for indicating the amount of the supplied power in accordance to the monitoring.

The power supply circuit 314 boosts or steps down DC voltage by using the electric power supplied from the transmitter (TX) 200, and then supplies it to the second controller 312 and the load circuit 310.

The modulator 308 modulates the coil current and coil voltage of the transmitting coil 202 by modulating the control signal S3 including the power control data, and modulating the coil current of the receiving coil 302.

The transmitter 200 (TX) in the non-contact power supply system 100 to which the position misalignment detection device 110 according to the embodiment is applied includes: a transmitting coil 202; a driver 204; a first controller 206; and a demodulator 208.

The driver 204 applies a driving signal S1 to the transmitting coil 202, and then causes the transmitting coil 202 to generate a power signal S2 of an electromagnetic field with a driving current flowing into the transmitting coil 202.

The first controller 206 controls transmitting power $P_t$ by controlling a switching frequency of the driver 204 on the basis of power control data included in the control signal S3 demodulated.

The demodulator 208 demodulates the control signal S3 included in the electric current or voltage of the transmitting coil 202.

As shown in FIG. 4, the position misalignment detection device 110 according to the embodiment is applied to the non-contact power supply system 100 for transmitting the electric power from the transmitter 200 (TX) to the receiver 300 (RX) with the non-contact power supply transmitter method, and can detect a position misalignment of the receiver 300 (RX) to which the electric power is transmitted from the transmitter 200 (TX) with the non-contact power supply transmitter method.

As shown in FIG. 4, the position misalignment detection device 110 according to the embodiment includes a comparator 120, a frequency counter 140, and a register 160, and can also detect a position misalignment of the receiver 300 (RX) on the transmitter 200 (TX) during electric charging.

The comparator 120 compares an electric current induced by the receiving coil 302 in the receiver 300 (RX) to which the electric power is transmitted from the transmitter 200 (TX) with the non-contact power supply transmitter method.

The frequency counter 140 is connected to the comparator 120 and counts the transmit frequency $f_i$ transmitted from the transmitter (TX) 200.

The register 160 store the counted value $F_i$ counted by the frequency counter 140.

If the receiver 300 (RX) on the transmitter 200 (TX) is misaligned during electric charging, position misalignment information IF can be notified from the register 160 to the system. In the embodiment, a setting device etc. are applicable thereto, as the system.

The position misalignment information IF is notified to the control unit 400 placed in the system.

The position misalignment information IF is a value obtained by detecting an amount of variation $\Delta P_t$ of the transmitted power $P_t$ transmitted from the transmitter 200 (TX) to the receiver 300 (RX) as an amount of variation $\Delta f_i$ of the transmit frequency $f_i$.

The control unit 400 which has received the position misalignment information IF notifies position misalignment feedback information FB to the receiver 300 (RX) so that a position of the receiver 300 (RX) on the transmitter 200 (TX) can be adjusted during electric charging.

Moreover, the control unit 400 which has received the position misalignment information IF may notify the position misalignment feedback information FB to both of the transmitter 200 (TX) and the receiver 300 (RX) so that a position of the receiver 300 (RX) on the transmitter 200 (TX) may be adjusted during electric charging.

The control unit 400 may include CPU, a microcomputer, or the like.

The register 160 and the control unit 400 may be connected to each other with an Inter-Integrated Circuit ($I^2C$) serial bus.

The position misalignment information IF notified from the register 160 to the control unit 400 can be transmitted through the $I^2C$ serial bus.

The position misalignment feedback information FB notified to the receiver 300 in the non-contact power supply system 100 (RX) from the control unit 400 can also be transmitted through the $I^2C$ serial bus.

The position misalignment detection device 110 according to the embodiment not only can detect the position misalignment by observing inclinations of the rising of the RECT starting voltage $V_{RECT}$ and the rising of the output voltage $V_{OUT}$, but also can detect a position misalignment during electric charging by monitoring a frequency component of the transmitted power $P_t$ from the transmitter (TX) 200 to the receiver (RX) 300 during the electric charging and by using the monitored frequency component as a parameter.

Figure 5A:
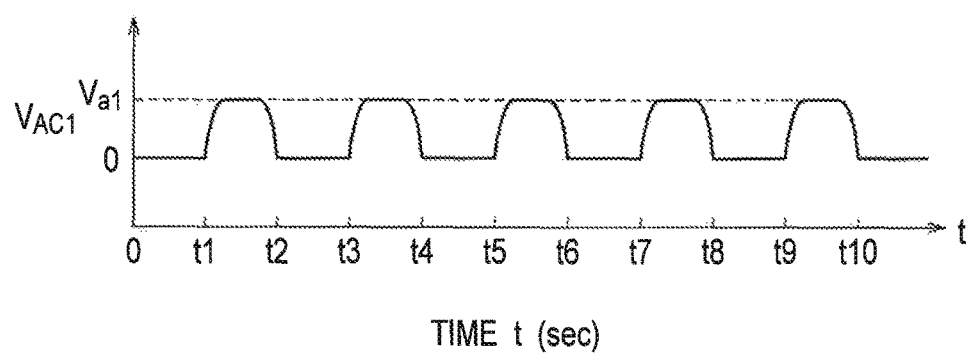
FIG. 5A is a waveform chart of a received voltage $V_{AC1}$, in the receiver of the non-contact power supply system to which the position misalignment detection device according to the embodiment is applied.
Figure 5B:
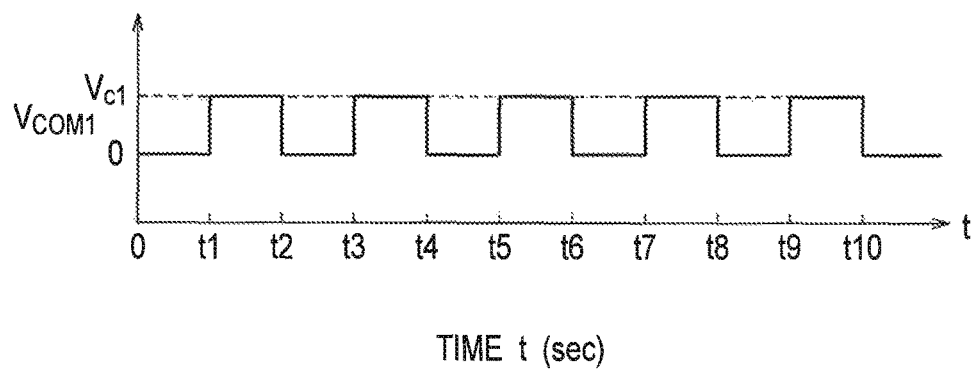
FIG. 5B is a waveform chart of a comparator output voltage $V_{COM1}$, in the receiver of the non-contact power supply system to which the position misalignment detection device according to the embodiment is applied.

In the receiver (RX) 300 to which the position misalignment detection device 110 according to the embodiment is applied, a waveform of the received voltage VAC1 is schematically expressed as shown in FIG. 5A, and a waveform of the comparator output voltage VCOM1 is schematically expressed as shown in FIG. 5B. The waveform of the received voltage VAC1 corresponds to a waveform in which a peak value of an alternating current (AC) waveform component conducted by the receiving coil 302 is clipped by a clipper or the like which is not illustrated in FIG. 4. The waveform of the received voltage VAC2 is also similarly expressed as shown in FIG. 5A.

(Electronic Apparatus)

Figure 6:
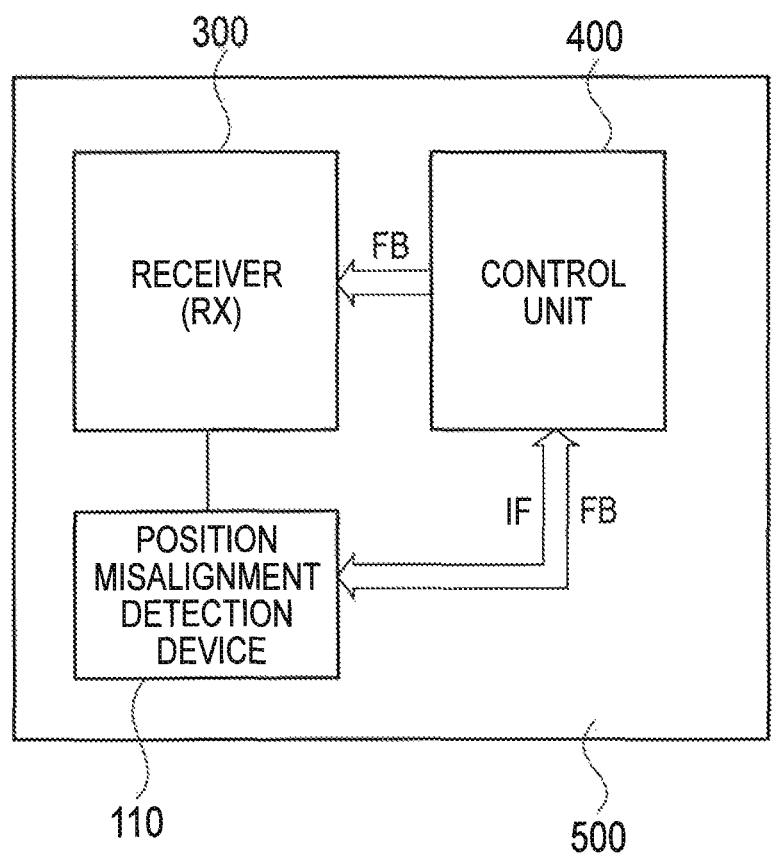
FIG. 6 is a schematic block configuration diagram of an electronic apparatus on which the position misalignment detection device according to the embodiment is mounted.

As shown in FIG. 6, an electronic apparatus 500 on which the position misalignment detection device 110 according to the embodiment is mounted includes: a receiver (RX) 300 to which the electric power is transmitted from the transmitter (TX) 200 with the non-contact power supply transmitter method; a position misalignment detection device 110 connected to the receiver (RX) 300, and capable of detecting a position misalignment of the receiver (RX) 300 on the transmitter (TX) 200 during electric charging: and a control unit 400 connected with the receiver (RX) 300 and the position misalignment detection device 110.

In the example shown in FIG. 6, the receiver (RX) 300 and the position misalignment detection device 110 are built in the electronic apparatus 500. In the embodiment, it is assumed that non-contact power transmitter ICs, mobile phones, tablet-type devices, smart phones, audio players, game machines, etc., for example, can be applied to the electronic apparatus 500.

In the electronic apparatus 500, the receiver (RX) 300 and the position misalignment detection device 110 are connected to the control unit 400 through the I2C serial bus etc.

The position misalignment detection device 110 includes: a comparator 120 configured to compare the electric current induced by the receiving coil 302 in the receiver (RX) 300 to which the electric power is transmitted from the transmitter (TX) 200 with the non-contact power supply transmitter method; a frequency counter 140 connected to the comparator 120 and configured to count transmit frequency $f_i$ transmitted from the transmitter (TX) 200; and a register 160 configured to store the counted value $F_i$ counted by the frequency counter 140.

If the receiver (RX) 300 on the transmitter (TX) 200 is misaligned during electric charging, the position misalignment information IF is a value obtained by detecting an amount of variation $\Delta P_t$ of the transmitted power $P_t$ transmitted from the transmitter (TX) 200 to the receiver (RX) 300 as an amount of variation $\Delta f$ of the transmit frequency f.

The control unit 400 which has received the position misalignment information IF notifies position misalignment feedback information FB to the receiver (RX) 300 so that a position of the receiver (RX) 300 on the transmitter (TX) 200 can be adjusted during electric charging.

Moreover, the control unit 400 which has received the position misalignment information IF may notify the position misalignment feedback information FB to both of the transmitter (TX) 200 and the receiver (RX) 300 so that a position of the receiver (RX) 300 on the transmitter (TX) 200 may be adjusted during electric charging.

The control unit 400 may include CPU, a microcomputer, or the like.

Figure 7:
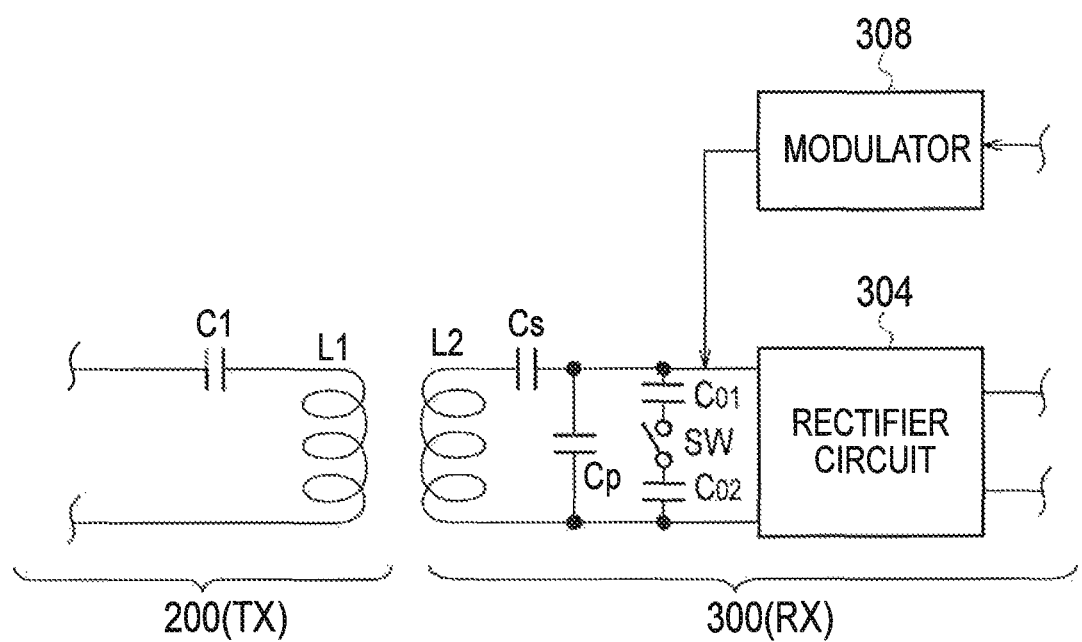
FIG. 7 is a detailed configuration diagram of a portion of transmitting and receiving coils in the non-contact power supply system to which the position misalignment detection device according to the embodiment is applied.

FIG. 7 shows a detailed configuration of a portion of the transmitting and receiving coils in the non-contact power supply system 100 to which the position misalignment detection device according to the embodiment is applied. In FIG. 7, illustration of the position misalignment detection device is omitted.

As shown in FIG. 7, the receiver (RX) 300 includes: a capacitor Cs connected in series to an inductance L2; and a capacitor Cp connected in parallel to the series circuit composed of the inductance L2 and the capacitor Cs. Moreover, the receiver (RX) 300 further includes a series circuit composed of a capacitor $C_{O1}$, a switch SW, and a capacitor $C_{O2}$, connected in parallel to the capacitor Cp. In the embodiment, a value of the capacitor Cp can be switched by switching ON and OFF of the switch SW. Since an amplitude of AM modulation becomes larger in particular at the time of light-load, and therefore a demodulation is difficult, it can be operated also at the time of light-load by substantially switching the value of capacitor Cp.

(Relationship Between Transmitted Power $P_t$ and Frequency f)

Figure 8:
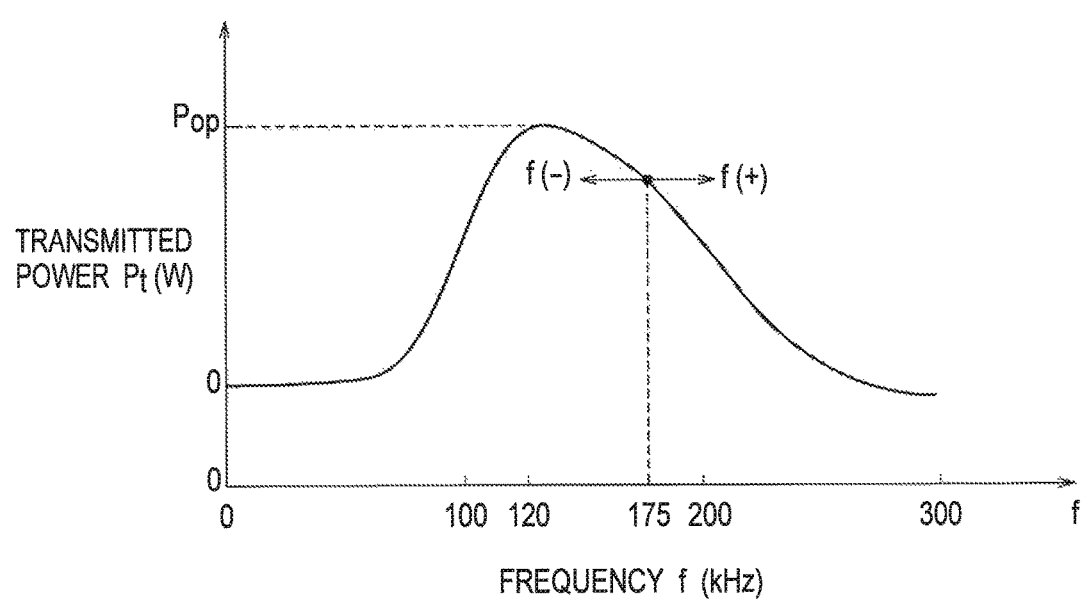
FIG. 8 shows a relationship between transmitted power $P_t$ and a frequency f, in the non-contact power supply system to which the position misalignment detection device according to the embodiment is applied.

A relationship between the transmitted power $P_t$ and the frequency f is expressed as schematically shown in FIG. 8, in the non-contact power supply system 100 to which the position misalignment detection device 100 according to the embodiment is applied. In the embodiment, a resonant frequency is 120 kHz, for example, and an optimal transmitted power Pop can be obtained at that time.

For example, on start-up of the non-contact power supply system 100, it is supposed that the frequency f of the transmitted power $P_t$ transmitted to the receiver (RX) 300 from the transmitter (TX) 200 is 175 kHz.

—Determination of Detecting Position Misalignment—

(a) Firstly, on start-up, if a position misalignment of the receiver (RX) 300 on the transmitter (TX) 200 is produced, power transmission efficiency between the transmitter (TX) 200 and the receiver (RX) 300 will be reduced.

(b) Since a charging current conducted to the receiver (RX) 300 is constant, a control signal S3, e.g. a control error packet for requesting more power transmission is transmitted from the receiver (RX) 300 to the transmitter (TX) 200.

(c) The transmitter (TX) 200 has received the control signal S3 executes more power transmission to the receiver (RX) 300.

(d) The transmit frequency f of the transmitted power $P_t$ transmitted from the transmitter (TX) 200 to the receiver (RX) 300 is monitored, and then if the value becomes an abnormal value, it is determined that a position misalignment is detected.

—Detection of Position Misalignment During Electric Charging and Feedback Therefrom—

During electric charging, if a position misalignment of the receiver (RX) 300 on the transmitter (TX) 200 is produced, the frequency f of the transmitted power $P_t$ becomes f(+), and it is in a direction of increasing frequency, then the transmitted power $P_t$ will be decreased. That is, it is determined that it is in a direction of power down and therefore the power transmission is insufficient. In this case, a relative position misalignment between the transmitter (TX) 200 and the receiver (RX) 300 is correctable with the position misalignment feedback information FB.

During subsequent electric charging, if the frequency f of the transmitted power $P_t$ becomes f(−) and, it is in a direction of decreasing frequency, the transmitted power $P_t$ will be increased. That is, it is determined that it is in a direction of power-up and therefore the power transmission is relatively satisfactory. Also in this case, a relative position misalignment between the transmitter (TX) 200 and the receiver (RX) 300 is correctable with the position misalignment feedback information FB.

Such an operation is further repeated, if the frequency f of the transmitted power $P_t$ gets close to the resonant frequency during subsequent electric charging, for example, then the transmitted power $P_t$ can be close to an optimal transmitted power Pop.

During subsequent electric charging, if the frequency f of the transmitted power $P_t$ becomes f(−) and, it is in a direction of decreasing frequency, the transmitted power $P_t$ will be decreased. That is, it is determined that it is in a direction of power down and therefore the power transmission is relatively insufficient. Also in this case, a relative position misalignment between the transmitter (TX) 200 and the receiver (RX) 300 is correctable with the position misalignment feedback information FB.

Such an operation is further repeated, if the frequency f of the transmitted power $P_t$ gets close to the resonant frequency during subsequent electric charging, for example, the transmitted power $P_t$ can be close to an optimal transmitted power Pop.

(Power Transmission)

Figure 9A:
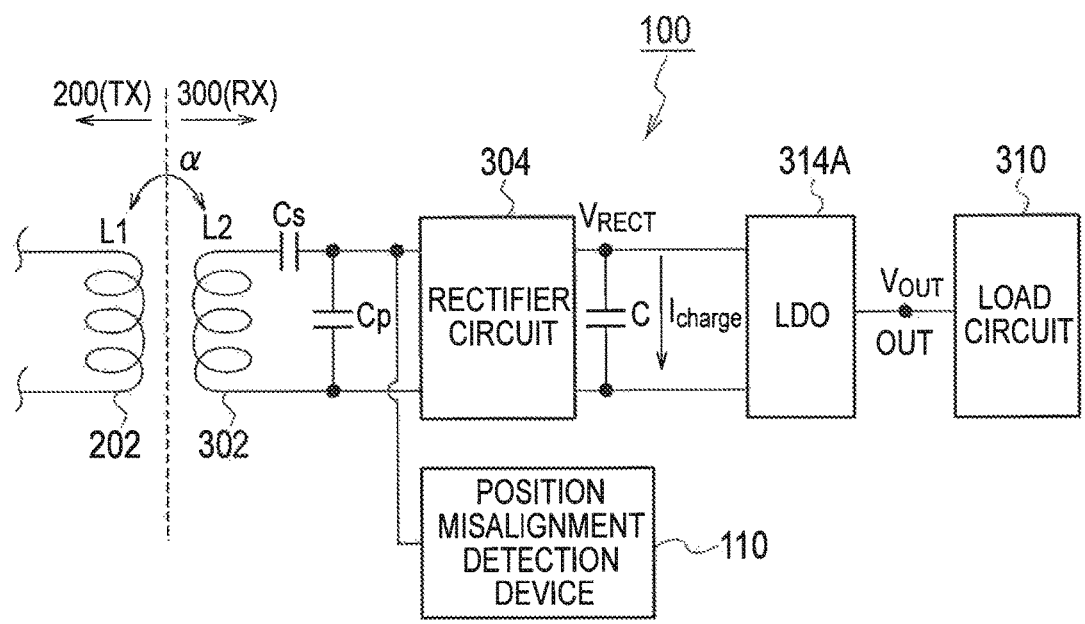
FIG. 9A shows an example of composing a power supply circuit from a Low Dropout (LDO), in the non-contact power supply system to which the position misalignment detection device according to the embodiment is applied.
Figure 9B:
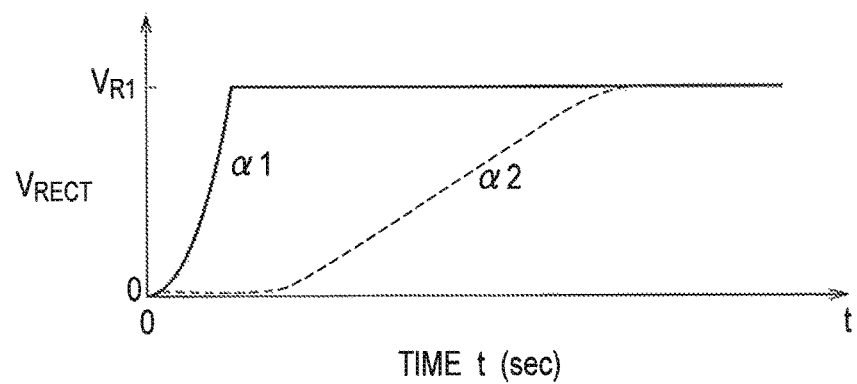
FIG. 9B shows rising characteristics of the RECT starting voltage $V_{RECT}$ using a coil parameter α of the transmitting and receiving coils as a parameter, in the non-contact power supply system to which the position misalignment detection device according to the embodiment is applied.

FIG. 9A shows an example of composing a power supply circuit from a Low Dropout (LDO), in the non-contact power supply system 100 to which the position misalignment detection device 110 according to the embodiment is applied. FIG. 9B schematically shows rising characteristics of the RECT starting voltage $V_{RECT}$ using a coil parameter α of transmitting and receiving coils as a parameter.

In FIG. 9A, only the transmitting coil 202 is shown as the transmitter (TX) 200, and illustration of other configurations is omitted. Similarly, only the receiving coil 302, the rectifier circuit 304, the LDO 314A, the load circuit 310, and the position misalignment detection device 110 are shown in FIG. 9A as the receiver (RX) 300, and illustration of other configurations is omitted. The rising characteristics of the RECT output voltage $V_{RECT}$ are determined with a time response of the electric current $I_{charge}$ used for charging the capacitor C at the both input edges of the LDO 314A. In FIG. 9B, the coil parameter α1>>coil parameter α2 is realized. That is, as the value of the coil parameter α becomes larger, the rising characteristics which reach the constant value $V_{R1}$ become faster. As shown in FIG. 9B, the value of the RECT output voltage $V_{RECT}$ becomes the constant value $V_{R1}$ after rising. The constant value $V_{R1}$ is equal to the DC output voltage $V_{dc}$ in FIG. 4.

In the non-contact power supply system 100 to which the position misalignment detection device 110 according to the embodiment is applied, as shown in FIG. 9A, the power transmission is executed by electromagnetic coupling between the transmitting coil 202 and the receiving coil 302.

In the non-contact power supply system 100 to which the position misalignment detection device 110 according to the embodiment is applied, a relationship between the coil parameter α and the maximum transmitting efficiency $\eta_{max}$ is as follows.

Values $Q_1$ and $Q_2$ of quality factor (Q) of the transmitting coil 202 and the receiving coil 302 are expressed with the following equations (1) and (2):

$$Q_1 = \omega L1/r_1 \quad (1)$$

$$Q_2 = \omega L2/r_2 \quad (2)$$

where L1 is an inductance of the transmitting coil 202, $r_1$ is series resistance, L2 is an inductance of the receiving coil 302, and $r_2$ is series resistance.

Moreover, the coil parameter α is expressed with the following equation (3), and the maximum transmitting efficiency $\eta_{max}$ is expressed with the following equation (4):

$$\alpha = k^2 Q_1 Q_2 \quad (3)$$

$$\eta_{MAX} = \alpha/[1+(1+\alpha)^{1/2}]^2 \quad (4)$$

where M is mutual inductance between the transmitting coil 202 and the receiving coil 302.

In this case, k is a coupling factor between the transmitting coil 202 and the receiving coil 302. That is, the coil parameter α governs the maximum transmitting efficiency $\eta_{MAX}$, and, the maximum transmitting efficiency $\eta_{MAX}$ becomes approximately 100% as the coil parameter α becomes equal to or greater than approximately $10^4$, for example.

In order to increase the value of the coil parameter α, it is preferred to increase the frequency ω from a form of the equation ωL/r indicating the Q value of the coil. On the other hand, the value of the coil parameter α is largely changed in accordance with a position misalignment of the receiver (RX) on the transmitter (TX), and the response characteristics of the RECT starting voltage $V_R=_7$ are also largely varied as shown in FIG. 9B. Furthermore, if the receiver (RX) on the transmitter (TX) is misaligned during electric charging, the value of the coil parameter α is largely changed. In FIG. 9B, since α1>>α2 is realized, the rising characteristics of the RECT starting voltage $V_{RECT}$ become satisfactory so that the coil parameter α of the transmitting and receiving coils becomes larger.

(Example of Plane Configuration of Transmitter)

Figure 10:
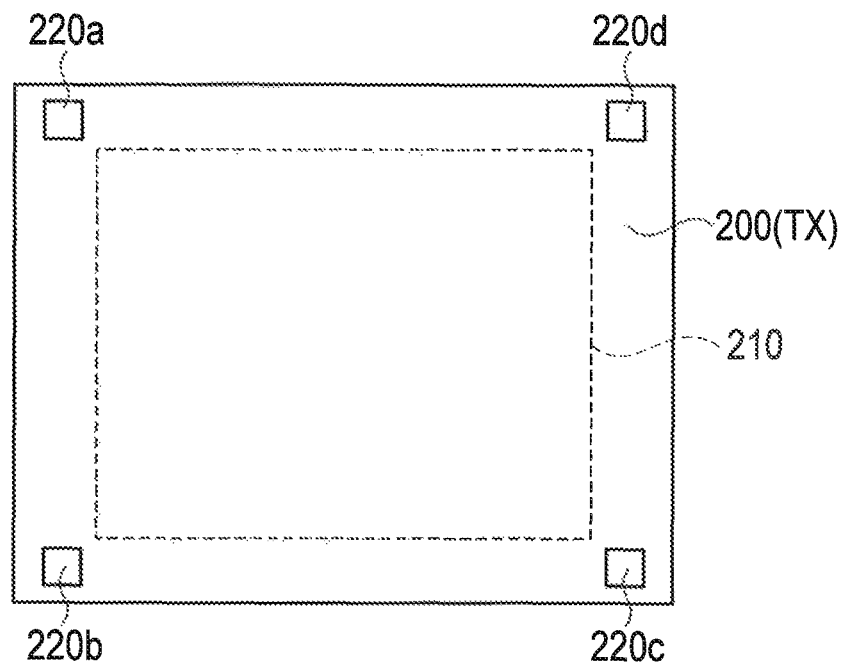
FIG. 10 shows an example of a schematic plane configuration of the transmitter, in the non-contact power supply system to which the position misalignment detection device according to the embodiment is applied.

FIG. 10 shows an example of a schematic plane configuration of the transmitter (TX) 200, in the non-contact power supply system 100 to which the position misalignment detection device 110 according to the embodiment is applied.

As shown in FIG. 10, the transmitter 200 (TX) may include: a charging stand 210; and alarm display units 220a, 220b, 220c, 220d respectively disposed on four corners in a peripheral part of the charging stand 210.

In the embodiment, the position misalignment feedback information FB notified to the transmitter 200 (TX) can be displayed on the alarm display units 220a, 220b, 220c, 220d, for example. The alarm display units 220a, 220b, 220c, 220d may be formed with a Light Emitting Diode (LED) etc. capable of emitting visible light, for example.

(Example of Plane Configuration of Receiver)

Figure 11:
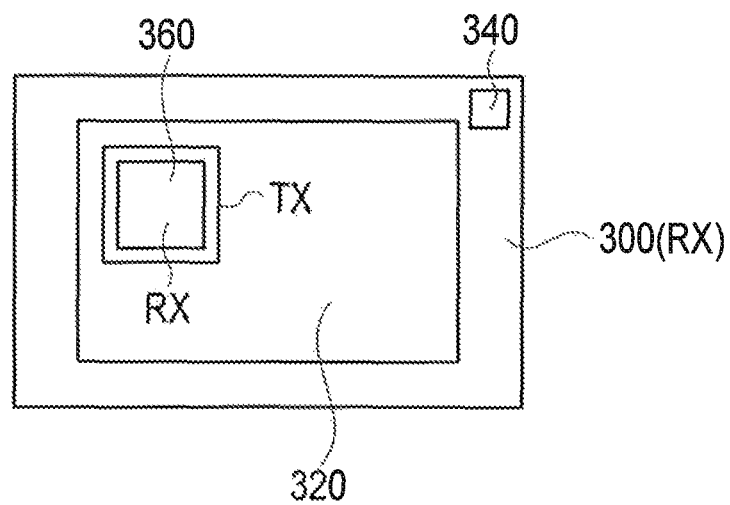
FIG. 11 shows an example of a schematic plane configuration of the receiver, in the non-contact power supply system to which the position misalignment detection device according to the embodiment is applied.

FIG. 11 shows an example of a schematic plane configuration of the receiver (RX) 300, in the non-contact power supply system 100 to which the position misalignment detection device 110 according to the embodiment is applied.

As shown in FIG. 11, the receiver 300 (RX) may include: a monitor display unit 320; and a position-misalignment display unit 360 disposed on the monitor display unit 320.

In the embodiment, the position misalignment feedback information FB notified to the receiver 300 (RX) can be displayed on the position-misalignment display unit 360, for example. More specifically, on the position-misalignment display unit 360, images indicating the transmitter (TX) and the receiver (RX) are displayed, both positional relationship can be observed, and thereby a relatively position misalignment between the transmitter (TX) and the receiver (RX) can be corrected.

Moreover, the receiver 300 (RX) may include an alarm display unit 340 disposed on a peripheral part of the monitor display unit 360, as shown in FIG. 11. In the embodiment, the position misalignment feedback information FB notified to the receiver 300 (RX) can be displayed on the alarm display unit 340, for example. The alarm display unit 340 may be formed with LED etc. capable of emitting visible light, for example.

(Detecting Method of Position Misalignment)

Figure 12:
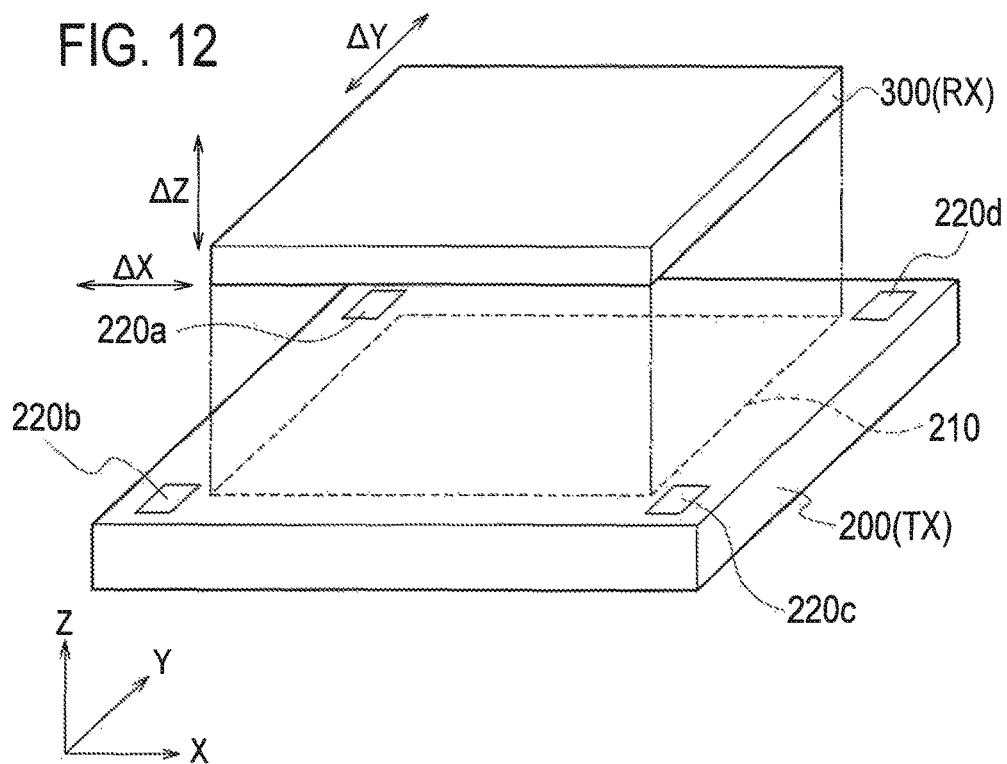
FIG. 12 is a schematic bird's-eye view configuration diagram of the transmitter and the receiver, in the non-contact power supply system to which the position misalignment detection device according to the embodiment is applied.
Figure 13:
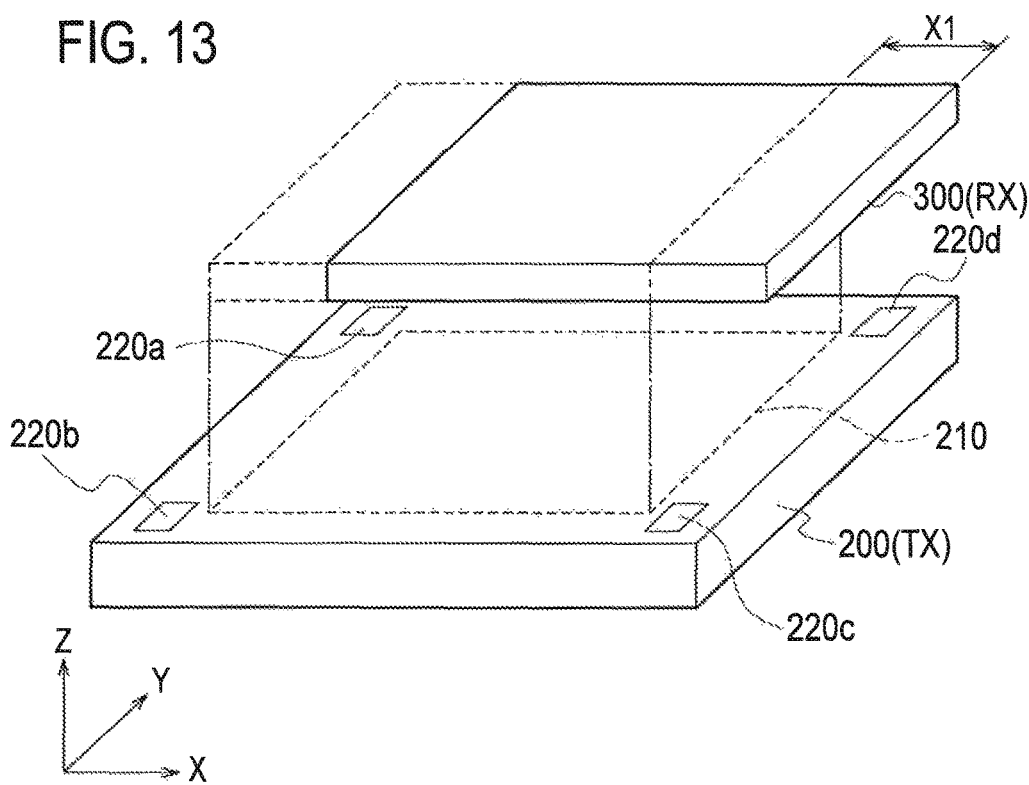
FIG. 13 shows a schematic bird's-eye view configuration example of the transmitter and the receiver, where the receiver has a position misalignment in a direction of +X for the amount of a distance X1 with respect to the transmitter from the positional relationship shown in FIG. 12, in the non-contact power supply system to which the position misalignment detection device according to the embodiment is applied.

FIG. 12 shows a schematic bird's-eye view configuration of the transmitter 200 (TX) and the receiver 300 (RX), in the non-contact power supply system 100 to which the position misalignment detection device 110 according to the embodiment is applied. Moreover, FIG. 13 shows an example of a schematic bird's-eye view configuration, where the receiver 300 (RX) has a position misalignment in a direction of +X for an amount of a distance X1 with respect to the transmitter 200 (TX) from the positional relationship shown in FIG. 12.

In FIG. 12, the receiver 300 (RX) is disposed in an upward direction of the charging stand 210 on the transmitter 200 (TX), and therefore no position misalignment is produced. If a position misalignment for an amount of ΔX, ΔY, ΔZ is produced in X, Y, Z directions of three-dimensional XYZ coordinate system from such a state, a shift of an operational point will be observed on the curved line indicating a relationship between the transmitted power $P_t$ and the frequency f from the transmitter 200 (TX) to the receiver 300 (RX).

Figure 14A:
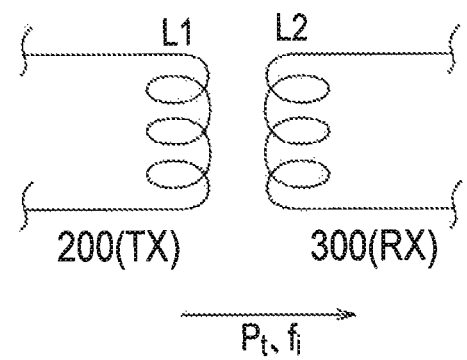
FIG. 14A is a schematic diagram of a portion of transmitting and receiving coils, in the non-contact power supply system to which the position misalignment detection device according to the embodiment is applied.
Figure 14B:
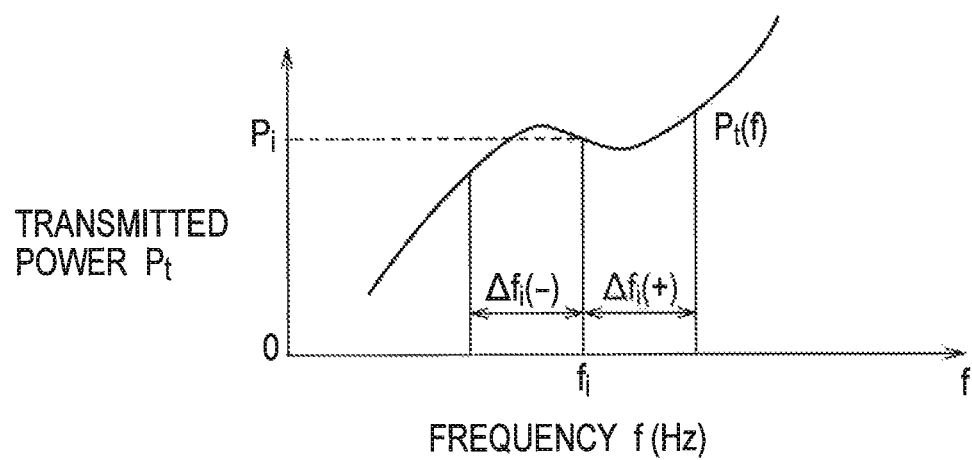
FIG. 14B a schematic diagram of a relationship between transmitted power $P_t$ and a frequency f, in the non-contact power supply system to which the position misalignment detection device according to the embodiment is applied.

In the non-contact power supply system 100 to which the position misalignment detection device 110 according to the embodiment is applied, FIG. 14A shows a schematic diagram of a portion of the transmitting and receiving coils between the transmitter 200 (TX) and the receiver 300 (RX), and FIG. 14B shows a schematic diagram of the curved line $P_t(f)$ indicating a relationship between the transmitted power $P_t$ and transmit frequency f transmitted to the receiver 300 (RX) from the transmitter 200 (TX).

In this case, on start-up of the non-contact power supply system 100 to which the position misalignment detection device 110 according to the embodiment is applied, the transmitted power is expressed with transmitted power $P_i=P_t(f_i)$ on the curved line $P_t(f)$, where $P_i$ is the transmitted power $P_t$ in the transmit frequency $f_i$. Moreover, the transmitted power when the frequency $f_i$ is shifted for an amount of $\Delta f_i$ (+) in (+) direction during electric charging is expressed with $P_t(f_i+\Delta f_i(+))$ On the other hand, the transmitted power when the frequency $f_i$ is shifted for an amount of $\Delta f_i(-)$ in (−) direction during electric charging is expressed with $P_t(f_i-\Delta f_i(-))$.

In this case, the difference of the transmitted powers $[P_t(f_i+\Delta f_i(+))-P_i]$ or $[P_i-P_t(f_i-\Delta f_i(-))]$ corresponds to the frequency deviation $\Delta f_i(+)$ or $\Delta f_i(-)$. Furthermore, the frequency deviation $\Delta f_i(+)$ or $\Delta f_i(-)$ corresponds to a three-dimensional position misalignment. $(\Delta X_i, \Delta Y_i, \Delta Z_i)$ on the relative disposition of the receiver 300 (RX) with respect to the transmitter 200 (TX).

Accordingly, the position misalignment on the relative disposition of the receiver 300 (RX) with respect to the transmitter 200 (TX) can be observed by observing the difference of transmitted powers.

In the position misalignment detection device 110 according to the embodiment, the rising characteristics of RECT output voltage $V_{RECT}$ on start-up can be observed, and a position misalignment can also be observed by observing an amount of variation of the transmit frequency also during the electric charging after the value of RECT output voltage $V_{RECT}$ becomes the constant value.

The position misalignment detection device 110 according to the embodiment is applicable to smart phones up to approximately 5 W level, laptop PCs and tablet PCs up to approximately 30 W level, electronic apparatuses up to approximately 120 W level, electric vehicles for which higher power is required, etc., as a power level of the transmitted power $P_t$, for example.

Figure 15A:
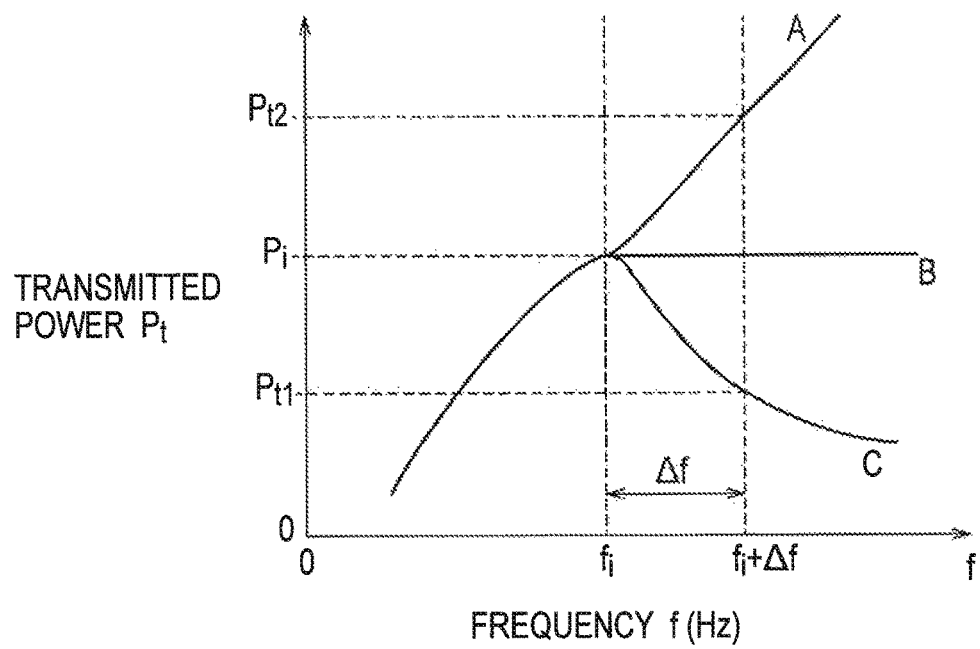
FIG. 15A is a schematic diagram of the relationship between the transmitted power $P_t$ and the frequency f, with an increasing frequency shift, in the non-contact power supply system to which the position misalignment detection device according to the embodiment is applied.
Figure 15B:
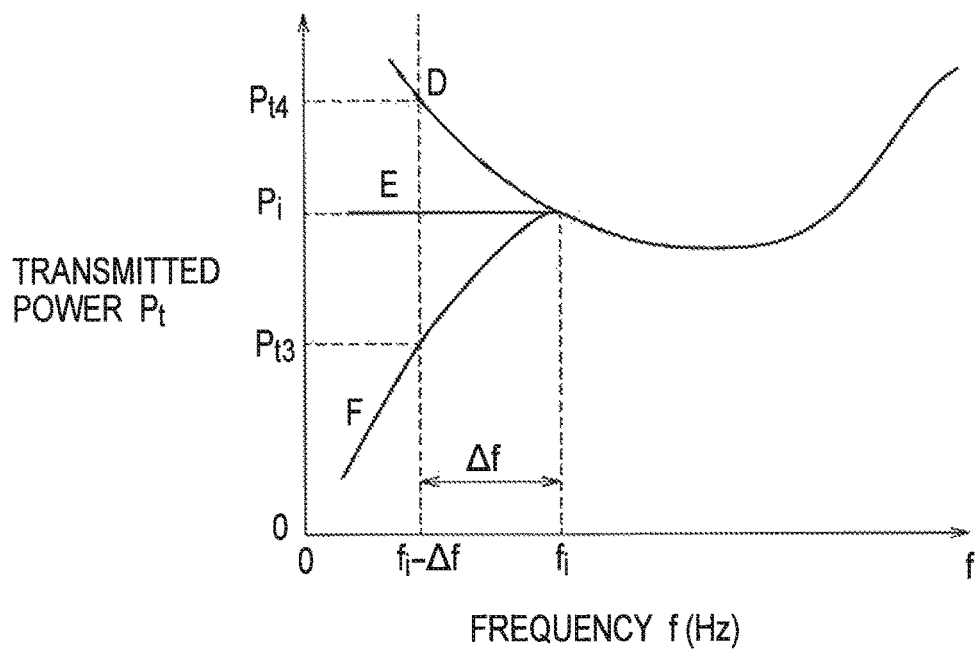
FIG. 15B is a schematic diagram of the relationship between the transmitted power $P_t$ and the frequency f, with a decreasing frequency shift, in the non-contact power supply system to which the position misalignment detection device according to the embodiment is applied.

In the non-contact power supply system 100 to which the position misalignment detection device 110 according to the embodiment is applied, FIG. 15A shows the relationship between the transmitted power $P_t$ and the frequency f, with an increasing frequency shift, and FIG. 15B shows the relationship between the transmitted power $P_t$ and the frequency f, with a decreasing frequency shift.

That is, if there is a frequency shift $\Delta f$ by which the frequency $f_i$ on start-up is increased during electric charging, as shown in FIG. 15A, the curved line A indicates characteristics of which the transmitted power $P_t$ is increased, the curved line B indicates characteristics of which the transmitted power $P_t$ is constant, and the curved line C indicates characteristics of which the transmitted power $P_t$ is decreased. In the case of the frequency $f=f_i+\Delta f$, the respective transmitted powers $P_t$ corresponding to the curved lines A, B, C indicate the respective values of $P_{t2}$, $P_i$, and $P_{t1}$, as shown in FIG. 15A.

On the other hand, if there is a frequency shift $\Delta f$ by which the frequency $f_i$ on start-up is decreased during electric charging, as shown in FIG. 15B, the curved line D indicates characteristics of which the transmitted power $P_t$ is increased, The curved line E indicates characteristics of which the transmitted power $P_t$ is constant, and the curved line F indicates characteristics of which the transmitted power $P_t$ is decreased. In the case of the frequency $f=f_i-\Delta f$, the respective transmitted powers $P_t$ corresponding to the curved lines D, E, F indicate the respective values of $P_{t4}$, Pi, and $P_{t3}$, as shown in FIG. 15B.

As shown in FIGS. 15A and 15B, the characteristics of which the transmitted power $P_t$ is constant indicate a close-to-optimal charged state, and also indicate that it is in a state where there is substantially no three-dimensional position misalignment on the relative disposition of the receiver 300 (RX) with respect to the transmitter 200 (TX). On the other hand, the characteristics of which the transmitted power $P_t$ is decreased indicate that there is a tendency to increase the three-dimensional position misalignment on the relative disposition of the receiver 300 (RX) with respect to the transmitter 200 (TX). Moreover, the characteristics of which the transmitted power $P_t$ is increased indicate that it is in an overcharge state such that the relative disposition of the receiver 300 (RX) is too close to the transmitter 200 (TX) in the light of the optimal positional relationship, for example.

Figure 16:
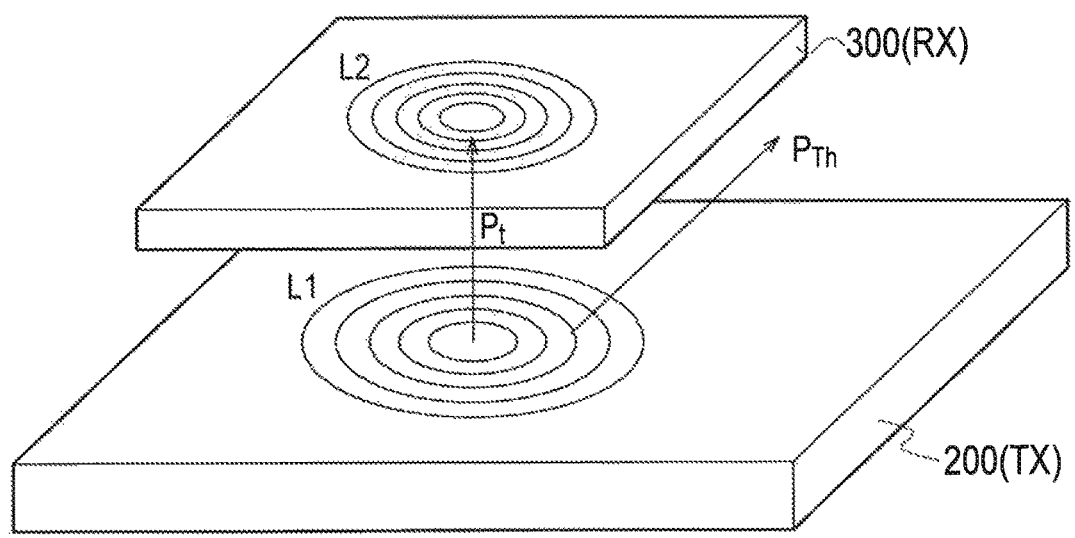
FIG. 16 is a schematic diagram showing a relationship between the transmitted power $P_t$ and leakage power $P_{Th}$ in a positional relationship between the transmitting and receiving coils, in the non-contact power supply system to which the position misalignment detection device according to the embodiment is applied.

FIG. 16 shows a schematic diagram showing a relationship between the transmitted power $P_t$ and leakage power $P_{Th}$ in a positional relationship between the transmitting and receiving coils, in the non-contact power supply system 100 to which the position misalignment detection device 110 according to the embodiment is applied. For example, if the relative disposition of the receiver 300 (RX) with respect to the transmitter 200 (TX) is misaligned from the optimal positional relationship, there is leakage power $P_{Th}$ which leaks outside, other than the electric power $P_t$ transmitted from the transmitter 200 (TX) to the receiver 300 (RX). Such leakage power $P_{Th}$ becomes electric power to be dissipated as a thermal loss.

As explained above, according to the embodiment, there can be provided the position misalignment detection device which can detect the position misalignment of the receiver on the transmitter during electric charging, and the electronic apparatus on which such a position misalignment detection device is mounted.

Other Embodiments

As explained above, the embodiment has been described, as a disclosure including associated description and drawings to be construed as illustrative, not restrictive. This disclosure makes clear a variety of alternative embodiment, working examples, and operational techniques for those skilled in the art.

Such being the case, the present embodiment covers a variety of embodiments, whether described or not.

INDUSTRIAL APPLICABILITY

The position misalignment detection device according to the embodiment can be used for various systems for supplying electric power with the non-contact power supply transmitter method, and can be used for electronic apparatuses, e.g. non-contact power transmitter ICs, mobile phones, tablet-type devices, smart phones, audio players, game machines, and the like.

What is claimed is:

1. A position misalignment detection device to be applied in a non-contact power supply system, the non-contact power supply system configured to supply an electric power to a receiver from a transmitter with a non-contact power supply transmitter method, the position misalignment detection device comprising:
    a comparator configured to compare with a compound value an electric current induced by a receiving coil in the receiver during the electric power is transmitted from the transmitter with the non-contact power supply transmitter method, and to output a comparison result as a waveform of a comparator output voltage;
    a frequency counter connected to the comparator, the frequency counter configured to count a transmit frequency of the electric power transmitted from the transmitter on the basis of a waveform of the comparator output voltage; and
    a register configured to store a counted value counted by the frequency counter,
    wherein
    the position misalignment detection device obtains an amount of variation of the transmit frequency of the electric power transmitted from the transmitter as an amount of variation of the transmission power on the basis of the count value stored in the register, and detects that the position misalignment of the receiver mounted on the transmitter occurs during electric charging on the basis of the obtained amount of variation of the transmitted electric power.

2. The position misalignment detection device according to claim 1, wherein
    the position misalignment detection device notifies position misalignment information to the non-contact power supply system if the position misalignment of the receiver mounted on the transmitter is detected during the electric charging, wherein the position misalignment information is a value obtained by the position misalignment detection device by detecting the amount of variation of the transmission power transmitted to the receiver from the transmitter as the amount of variation of the transmit frequency.

3. The position misalignment detection device according to claim 2, wherein the position misalignment information is notified to a control unit disposed in the non-contact power supply system.

4. The position misalignment detection device according to claim 3, wherein the position misalignment detection device detects that the position misalignment occurs, when the amount of variation of the transmitted electric power which is obtained exceeds a predetermined increased amount.

5. The position misalignment detection device according to claim 3 wherein the control unit which has received the position misalignment information notifies the received position misalignment information as position misalignment feedback information to the receiver.

6. The position misalignment detection device according to claim 5, wherein the transmitter comprises: a charging stand; and first alarm display units respectively disposed on four corners in a peripheral part of the charging stand, wherein the transmitter displays the notified position misalignment feedback information on the first alarm display units.

7. The position misalignment detection device according to claim 6, wherein the first alarm display units comprise a light emitting diode.

8. The position misalignment detection device according to claim 5, wherein the receiver comprises: a monitor display unit; and a position-misalignment display unit disposed on the monitor display unit, wherein the receiver displays the notified position misalignment feedback information on the position-misalignment display unit.

9. The position misalignment detection device according to claim 8, wherein an image indicating the transmitter and the receiver is displayed on the position-misalignment display unit, and thereby a relative position misalignment between the transmitter and the receiver is displayed on the position-misalignment display unit.

10. The position misalignment detection device according to claim 5, wherein the receiver comprises a second alarm display unit in a peripheral part of the monitor display unit, wherein the receiver displays the notified position misalignment feedback information on the second alarm display unit.

11. The position misalignment detection device according to claim 10, wherein the second alarm display unit comprises a light emitting diode.

12. The position misalignment detection device according to claim 3, wherein the control unit which has received the position misalignment information notifies the received position misalignment information as position misalignment feedback information to the transmitter and the receiver.

13. An electronic apparatus comprising:

a receiver to which an electric power is transmitted from a transmitter with a non-contact power supply transmitter method;

a position misalignment detection device connected to the receiver; and a control unit connected to the receiver and the position misalignment detection device, wherein the position misalignment detection device comprises:

a comparator configured to compare with a compound value an electric current induced by a receiving coil in the receiver during the electric power is transmitted from the transmitter with the non-contact power supply transmitter method, and to output a comparison result as a waveform of a comparator output voltage;

a frequency counter connected to the comparator, the frequency counter configured to count a transmit frequency of the electric power transmitted from the transmitter on the basis of a waveform of the comparator output voltage; and a register configured to store a counted value counted by the frequency counter, and wherein the position misalignment detection device obtains an amount of variation of the transmit frequency of the electric power transmitted from the transmitter as an amount of variation of the transmission power on the basis of the count value stored in the register, and detects that the position misalignment of the receiver mounted on the transmitter occurs during electric charging on the basis of the obtained amount of variation of the transmitted electric power.

14. The electronic apparatus according to claim 13, wherein the position misalignment detection device notifies position misalignment information to the non-contact power supply system if the position misalignment of the receiver mounted on the transmitter is detected during the electric charging, wherein the position misalignment information is a value obtained by the position misalignment detection device by detecting the amount of variation of the transmission power transmitted to the receiver from the transmitter as the amount of variation of the transmit frequency.

15. The electronic apparatus according to claim 14, wherein the control unit which has received the position misalignment information notifies the received position misalignment information as position misalignment feedback information to the receiver.

16. The electronic apparatus according to claim 14, wherein the control unit which has received the position misalignment information notifies the received position misalignment information as position misalignment feedback information to the transmitter and the receiver.

17. The electronic apparatus according to claim 13, wherein the position misalignment detection device detects that the position misalignment occurs, when the amount of variation of the transmitted electric power which is obtained exceeds a predetermined increased amount.

18. The electronic apparatus according to claim 13, wherein the control unit comprises one selected from the group consisting of a CPU and a microcomputer.

19. The electronic apparatus according to claim 13, wherein
the electronic apparatus is one selected from the group consisting of a non-contact power receiver IC, a mobile phone, a tablet-type device, a smart phone, an audio player, and a game machine.

* * * * *